US011455758B2

(12) United States Patent
Melzer et al.

(10) Patent No.: US 11,455,758 B2
(45) Date of Patent: Sep. 27, 2022

(54) OCEANIC EDDY DETECTION FROM TWO-DIMENSIONAL SEA LEVEL TOPOGRAPHY GRADIENTS

(71) Applicant: The Government of the United States of America, as represented by the Secretary of the Navy, Arlington, VA (US)

(72) Inventors: Bryce Melzer, Slidell, LA (US); Tommy Jensen, Slidell, LA (US); Adam Rydbeck, Pass Christian, MS (US); Ebenezer Nyadjro, Bay Saint Louis, MS (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 312 days.

(21) Appl. No.: 16/687,038

(22) Filed: Nov. 18, 2019

(65) Prior Publication Data
US 2020/0160568 A1    May 21, 2020

Related U.S. Application Data

(60) Provisional application No. 62/768,327, filed on Nov. 16, 2018.

(51) Int. Cl.
*G06T 11/00* (2006.01)
*G01V 1/38* (2006.01)
*G01C 13/00* (2006.01)

(52) U.S. Cl.
CPC .......... *G06T 11/008* (2013.01); *G06T 11/005* (2013.01); *G01C 13/002* (2013.01); *G01V 1/38* (2013.01)

(58) Field of Classification Search
None
See application file for complete search history.

(56) References Cited

PUBLICATIONS

Fernandes, Armando Manuel, Susana Nascimento, and Dmitri Boutov. "Automatic identification of oceanic eddies in infrared satellite images". Computers & Geosciences 37. p. 1783-1792. Published Feb. 2, 2011. (Year: 2011).*

(Continued)

*Primary Examiner* — Aaron M Richer
(74) *Attorney, Agent, or Firm* — US Naval Research Laboratory; Nigel Fontenot

(57) ABSTRACT

Systems and methods are provided for identification and tracking of large semi-closed eddies (e.g., oceanic eddies). For example, embodiments of the present disclosure provide systems and methods for detecting a cyclonic or anticyclonic eddy in the ocean and determining its size, shape, and intensity given a single input field. In an embodiment, this input is a two-dimensional (2D) gridded field of Sea Surface Height Anomaly (SSHA) or Absolute Dynamic Topography (ADT), both of which can be determined from satellite based observations. Embodiments of the present disclosure are more accurate and computationally efficient than traditional methods and further provide high adaptability that will enable additional improvements as advances are made in satellite-based observations.

20 Claims, 12 Drawing Sheets

(56) References Cited

PUBLICATIONS

Amores, Angel, Gabriel Jordà, Thomas Arsouze, and Julien Le Sommer. "Up to What Extent Can We Characterize Ocean Eddies Using Present-Day Gridded Altimetric Products". Journal of Geophysical Research: Oceans, 123. p. 7220-7236. Published Oct. 12, 2018. (Year: 2018).*

Buckingham, C. E., and P. C. Cornillon. "The contribution of eddies to striations in absolute dynamic topography". Journal of Geophysical Research: Oceans, 118. p. 448-461. Published Jan. 31, 2013. (Year: 2013).*

Faghmous, James H., Ivy Frenger, Yuanshun Yao, Robert Warmka, Aron Lindell and Vipin Kumar. "A daily global mesoscale ocean eddy dataset from satellite altimetry". Scientific Data. p. 1-16. Published Jun. 9, 2015. (Year: 2015).*

* cited by examiner

OCEANIC EDDY DETECTION FROM TWO-DIMENSIONAL SEA LEVEL TOPOGRAPHY GRADIENTS

CROSS REFERENCE TO RELATED APPLICATIONS

This application claims the benefit of U.S. Provisional Patent Application No. 62/768,327, filed on Nov. 16, 2018, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, D.C. 20375, USA; +1.202.767.7230; techtran@nrl.navy.mil, referencing Navy Case Number 109057-US2.

FIELD OF THE DISCLOSURE

This disclosure relates to topography, including ocean topography.

BACKGROUND

Accurate representation of ocean currents and eddies is imperative because, for example, any potential surface indicator of the subsurface state of the ocean is an integral component in forecasting efforts that tend to suffer from a lack of subsurface measurements to assimilate and validate their runs. Air-sea interaction plays a central role in the presence of anticyclonic eddies and associated fronts along their boundaries, impacting local weather conditions and resonating in model simulations that rely on feedback mechanisms between the ocean and atmosphere.

Sea Surface Height Anomaly (SSHA) is traditionally used as a proxy for ocean currents in the absence of direct measurements, since the pressure gradients that drive currents at the surface generate distinct signatures of SSHA indicative of the flow pattern which can be exploited. Some prior techniques used to detect ocean currents (e.g., techniques based on SSHA) create unnecessary assumptions that limit the range of applicability, which can lead to false positives and/or clipping the edges of an eddy. Some prior techniques tend to underestimate the radius along strong fronts and overestimate the radius along weak gradients, which can lead to distorted shapes in eddies where the sea level signature is not uniformly distributed. Some prior methods require a predetermined threshold value to be specified, which can prove to be a daunting task when considering the broad temporal and spatial scales that oceanic eddies encompass and can damper any attempt to automate the identification and tracking of eddies. Hence, the output of such algorithms are very sensitive to the selection of such a threshold and can generate false positives. Some prior techniques experience difficulty when applied to relatively large mesoscale eddies.

Further, prior techniques for detecting eddies rely on geostrophic approximations, which are valid only when the wind-drive Ekman component of ocean currents and inertial effects are small by comparison. As such, eddies at low latitude tend to be mischaracterized because the Rossby number approaches infinity near the equator as a result of diminishing rotational influence, driving the geostrophic term to 0. Further, regions of strong wind stress can display an Ekman component that is comparable to the geostrophic component. Both cases are particularly true in the case of the Great Whirl, for example, which is centered at approximately 7° N and is subject to distortion from intense monsoon winds.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
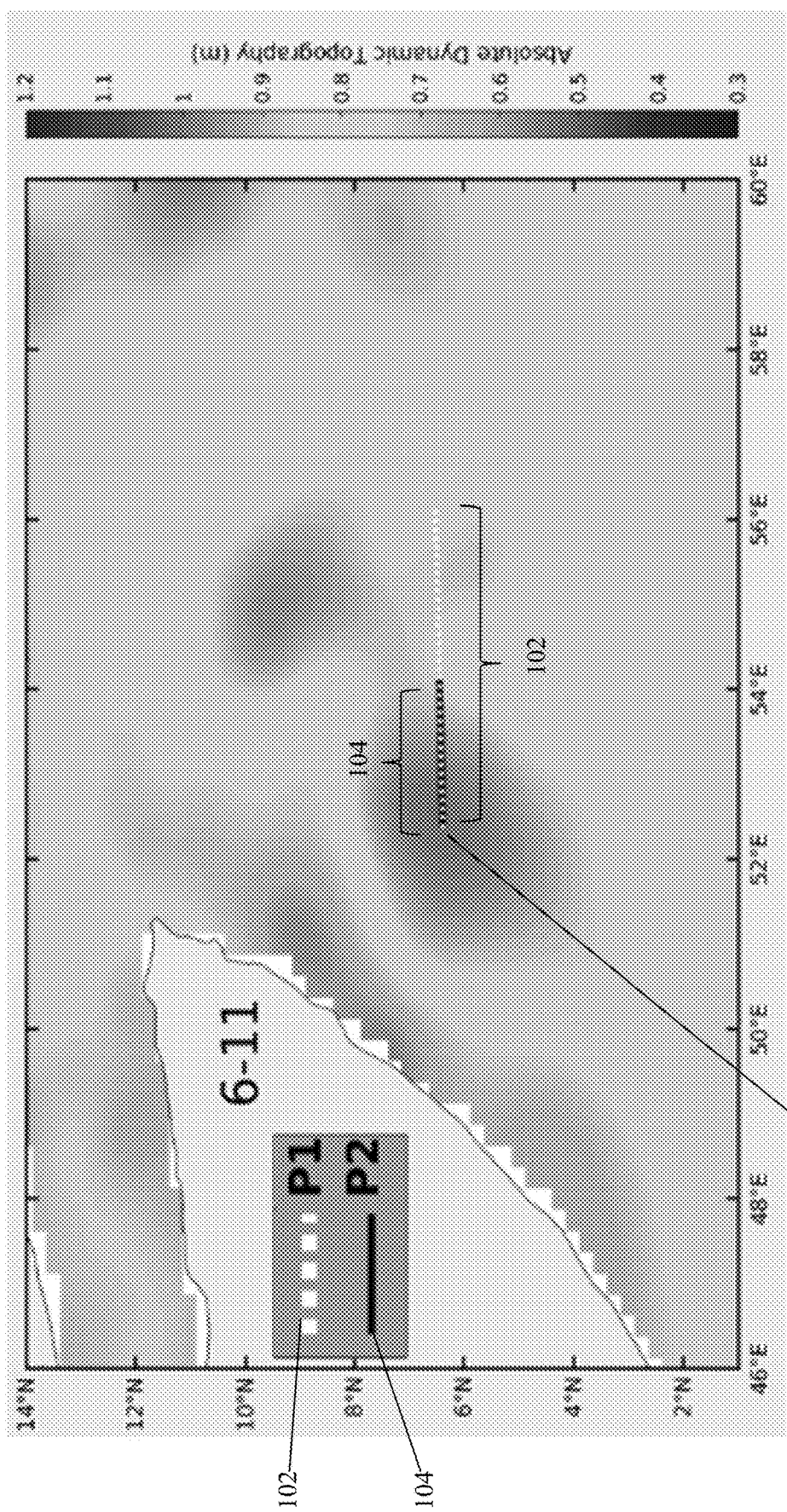
FIGS. 1-3 are diagrams illustrating drawing a polygon representative of an eddy in accordance with embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Embodiments of the present disclosure provide systems and methods for identification and tracking of large semi-closed eddies (e.g., oceanic eddies). Embodiments of the present disclosure are more accurate and computationally efficient than traditional methods and further provide high adaptability that will enable additional improvements as advances are made in satellite-based observations. For example, embodiments of the present disclosure provide systems and methods for detecting a cyclonic or anticyclonic eddy in the ocean and determining its size, shape, and intensity given a single input field. In an embodiment, this input is a two-dimensional (2D) gridded field of Sea Surface Height Anomaly (SSHA) or Absolute Dynamic Topography (ADT), both of which can be determined from satellite based observations. For simplicity, we will henceforth assume that SSHA and ADT are interchangeable terms, as they are differentiated by different reference points and can therefore be adjusted appropriately.

Operations involving sonar or other acoustic instrumentation can benefit from knowledge of surrounding water properties, as any variability in the medium can refract transmitted signals. Eddies generate vertical upwelling or downwelling of water near the center, determined by the direction of rotation. Regions of upwelling contain higher nutrient concentrations, promoting phytoplankton production, which in turn can effectively aggregate fish for more effective commercial fishing. Downwelling associated with anticyclonic eddies creates the opposite effect, suppressing phytoplankton growth and limiting resources for zooplankton and fish. Embodiments of the present disclosure can be used to forecast save vs unsafe drilling conditions as well as potential oil slick tracking and mitigation.

2. Detecting Ocean Eddies

In an embodiment, the polygon representative of an eddy is approximated by fitting a polygon edges Q over the angular domain $\varphi$ [0:2$\pi$], where $Q(r_0(\varphi))$ are local polar coordinates with respect to the location of the eddy's ADT maximum or minimum, depending on the rotation of the eddy of interest. In an embodiment, the eddy center is a local sea level extrema, and $r_0$ is defined as the shorter length of radii $r_1$, $r_2$ (e.g., $r_0=\min(r_1, r_2)$), where $r_1$, $r_2$ are the radii of the points P1, P2 at angle $\varphi$. In an embodiment, points $Q(r_0(\varphi))$ describe the discretized locations of edges which collectively define a polygon representative of the eddy, where $r_0$ is defined as the shorter length of radii $r_1$, $r_2$.

In an embodiment, the eddy center is first identified as the location of the highest ADT anomaly in the domain. Next, azimuths of an ellipse can be created piecewise in polar angles (0:2$\pi$) that extend outward from this central point. In an embodiment, the radius of each azimuth corresponds to a predetermined change in ADT relative to the central maximum. In an embodiment, this ADT change is a function of time and space, making it an independent calculation for each azimuth. A contour enclosing the eddy can then be created by connecting the endpoints of remaining azimuths after flagging and removing those outside of a realistic length scale. In an embodiment, this flagging procedure allows formation and termination dates to be assigned based on the approach of, and departure from, a state of zero flagged azimuths.

After identifying the eddy (e.g., the Great Whirl), each subsequent time step can repeat the routine with the center location now confined to the area enclosed by the previous time step to ensure consistent tracking. In an embodiment, the algorithm operates on the basis of a relative rather than an absolute sea level threshold, which inherently filters out climate-level variability without requiring additional processing. As it does not necessarily rely on a closed contour to operate, this method poses an advantage for permanent features that behave similarly to mesoscale eddies but lack a closed rotation, such as the Great Whirl, Loop Current, and Agulhas retroflection regions.

Figure 2:
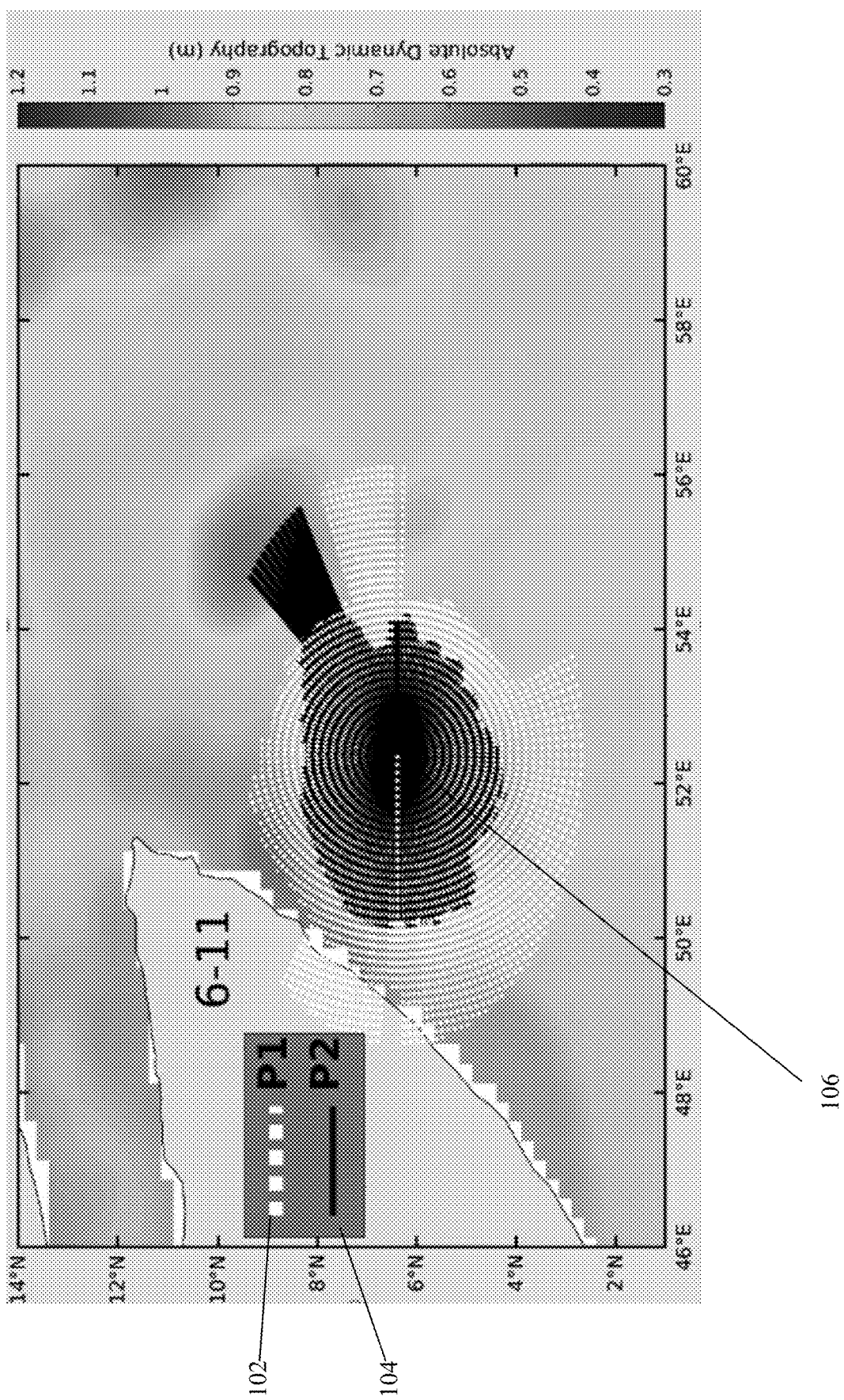
Figure 3:
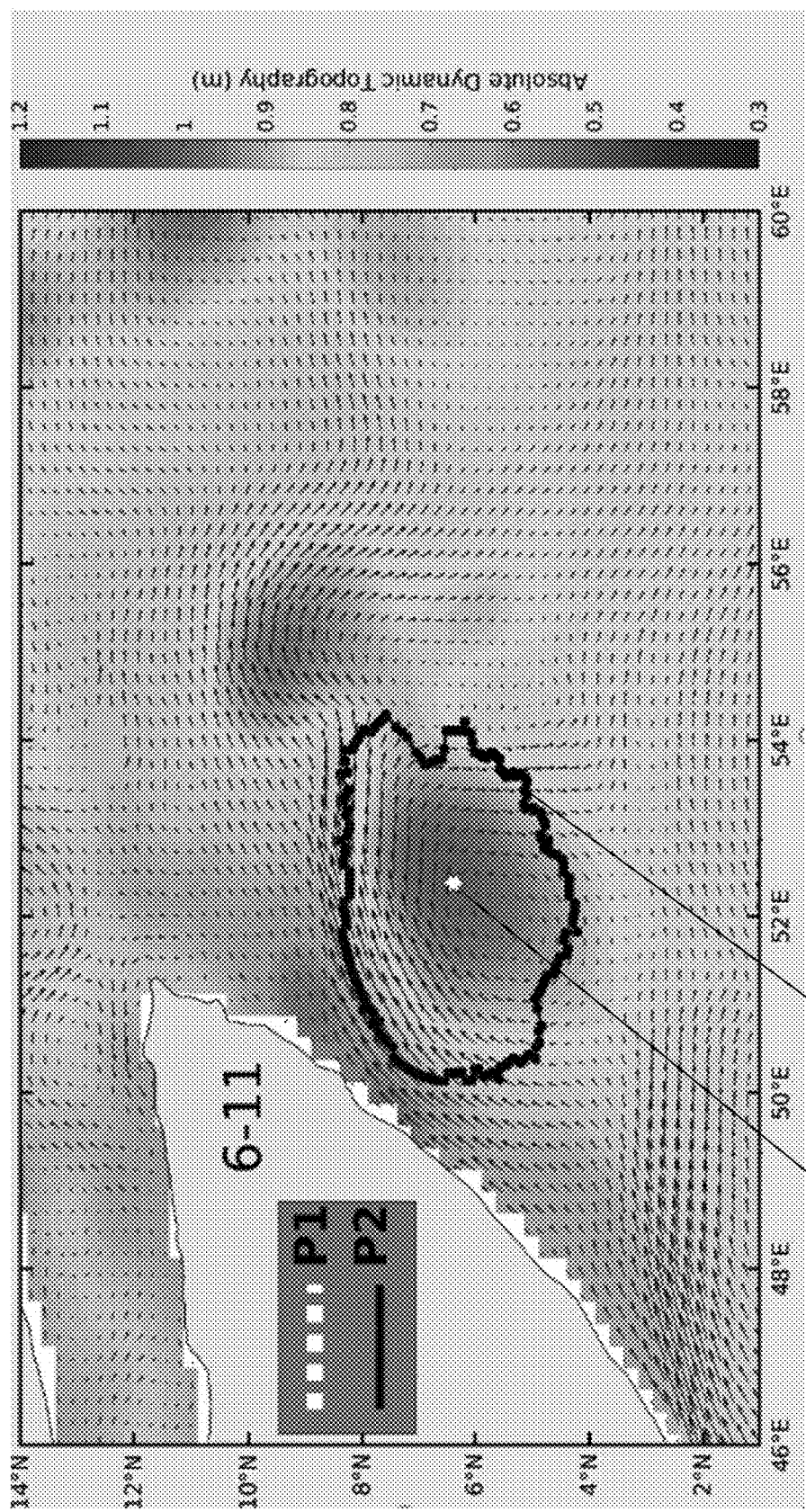

FIGS. 1-3 are diagrams illustrating drawing a polygon representative of an eddy in accordance with embodiments of the present disclosure. In FIG. 1 points P1 102 and P2 104 are drawn from the center 106 of an eddy at $\varphi$=0. FIG. 2 shows points P1 102 and P2 104 drawn from center 106 for $\varphi$=0 to $\varphi$=2$\pi$. FIG. 3 shows the resulting polygon 302 drawn around center 106.

In an embodiment, the points P1, P2 with radii r1, r2, are defined by the conditions $$P1: \left(\frac{dADT}{dr} = 0\right), P2: ADT_{max} * F(\varphi).$$

In an embodiment, $$\frac{dADT}{dr}$$

is the instantaneous radial gradient along each azimuth angle. In simple terms, P1 is the point at which the radial gradient of ADT reverses, and P2 is the point at which the radial ADT has declined to a fraction F of the ADT maximum. In an embodiment, the minimum of the radii defined by the endpoints, P1 and P2, is then used to describe the radial extent of the polygon at each angle. The point P2 can be introduced for cases where the point of gradient reversal (P1) is not a good representation of an eddy (e.g., anticyclonic eddy adjacent to cylonic eddy). For such a case, a fraction of $ADT_{max}$ can be determined that defines a polygon of points that coincide with the edges of the eddy, as defined by the maximum velocity contour.

The reduction from the $ADT_{max}$ by the fraction F can be given by $F(\varphi)=F_0/(AP_{space}+AP_{time})$, where $F_0$ is a constant. For example, in an embodiment, $F_0$ can be set to 0.8 (i.e., a reduction to 80% of $ADT_{max}$). In an embodiment, $F_0$ is modified by a sum of two adjustment parameters, $AP_{space}$ and $AP_{time}$, that give the fraction $F(\varphi)$ a dynamic flexibility in both time and space.

In an embodiment, $AP_{space}$ is the nondimensional radial gradient anomaly defined along each azimuth $\varphi[0:2\pi]$ using Equation (1):

$$AP_{space} = 1 + \left[ (0.1) * \frac{\frac{dADT'}{dr} - \frac{d\overline{ADT}}{dr}}{\sigma\left(\frac{dADT}{dr}\right)} \right] \quad (1)$$

In Equation (1), $$\frac{dADT'}{dR}$$

is the ADT gradient along the current angle, $$\frac{d\overline{ADT}}{dR}$$

is the average ADT gradient along all angles, and σ represents standard deviation. In an embodiment, $AP_{space}$ is designed to achieve a more realistic geometry by applying normalized smoothing to irregular shapes that isocontours tend to yield.

Figure 4:
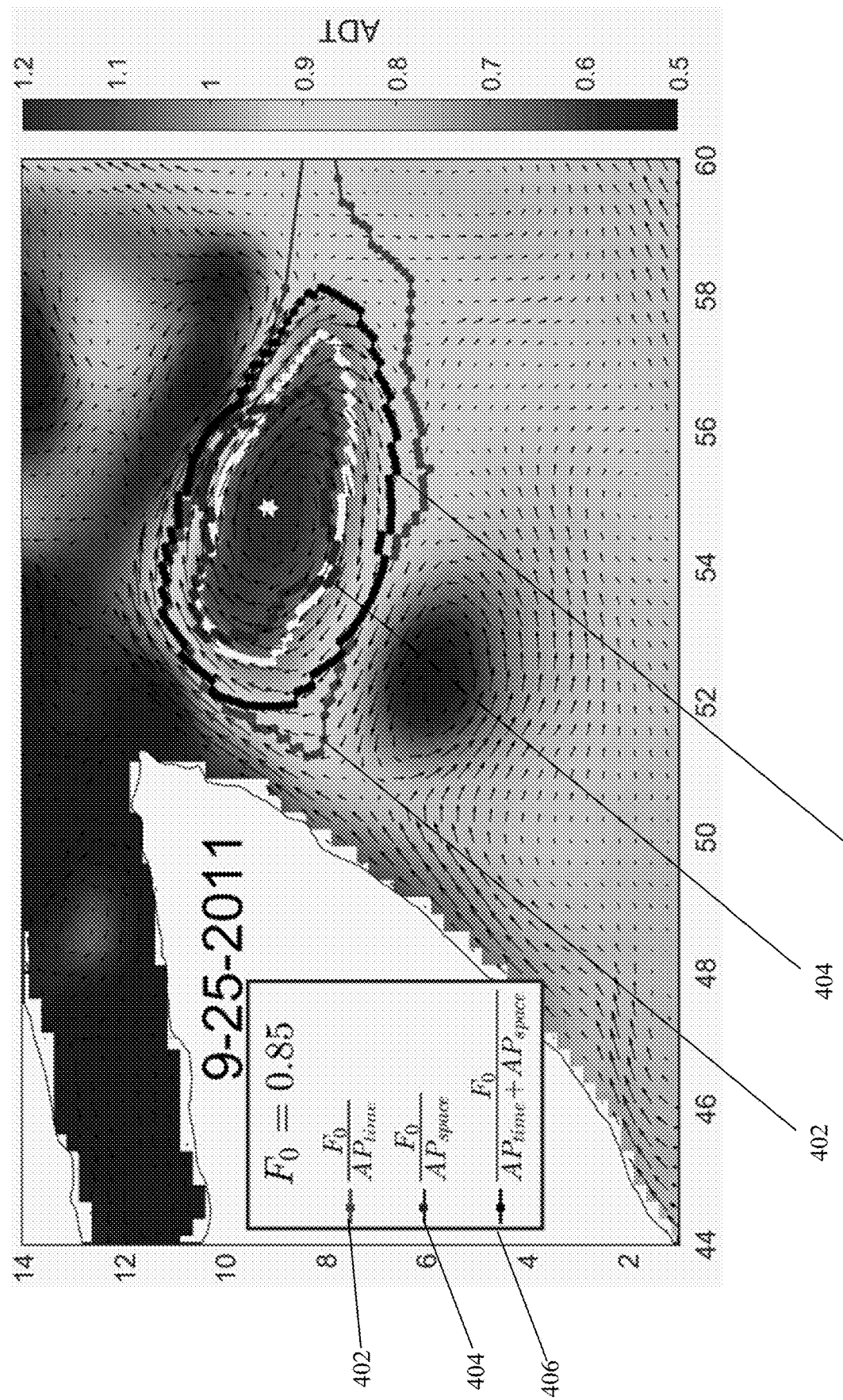
FIG. 4 is another diagram illustrating drawing polygons representative of an eddy in accordance with embodiments of the present disclosure.

In an embodiment, $AP_{time}$ is the nondimensional temporal change in the eddy ADT amplitude from the eddy formation time, $t_0$, and is defined as 1 for $t \le t_0$ and $ADT_{max}(t)/ADT_{max}(t_0)$ for $t > t_0$. In an embodiment, $AP_{time}$ accounts for waxing/waning gradient strengths. Without it, the surface area of an eddy can artificially increase upon weakening and decrease in surface area upon strengthening. FIG. 4 is another diagram illustrating drawing polygons representative of an eddy in accordance with embodiments of the present disclosure. In FIG. 4, polygon 402 represents a plot of $F_0/AP_{time}$, polygon 404 represents a plot of $F_0/AP_{space}$, and polygon 406 represents a plot of $F_0/(AP_{time}+AP_{space})$.

In an embodiment, the length of the eddy radius at each angle is further constrained by a maximum length, which is designed to eliminate spurious fitting of unrealistically large eddies. In an embodiment, azimuths where the radius exceeds the maximum length scale $r_0(\varphi) > 3*L_d$ are undefined, as it is assumed the eddy does not form a closed circulation at the corresponding $\varphi$ value. $L_d$ is the internal Rossby radius of deformation and can be used as an approximation for the maximum length scale for an oceanic eddy ($L_d$ is ~140 km for the Great Whirl).

In an embodiment, a polygon can be generated by connecting the endpoints of each azimuth in a clockwise or counterclockwise fashion, where $Q(r_0(\varphi))$ is defined. A polygon can be fitted regardless of whether the circulation is closed. Taking this into account, the existence of an eddy can be determined by a user-defined ratio of defined azimuths along the entire range of angles $[0\ 2\pi]$, intended to approximate the degree of eddy enclosure.

In an embodiment, an eddy is first identified when a 5-day running mean of the ratio below exceeds a user-defined threshold P (e.g., 0.95) and will continue to exist as long as the condition (# of defined aximuths)/(# of total azimuths)≥P remains true. In an embodiment, this ratio approximates the degree of eddy enclosure. In an embodiment, semi-enclosed circulation can be omitted by setting the condition to P=1, or retained by lowering the P value. Eddies can be tracked such that the location of the central point at time (t) lies within the polygon of an eddy that existed at time (t−1); if the point lies outside of all existing contours, it can be considered a unique eddy.

3. Exemplary Methods for Detecting Ocean Eddies

Figure 5:
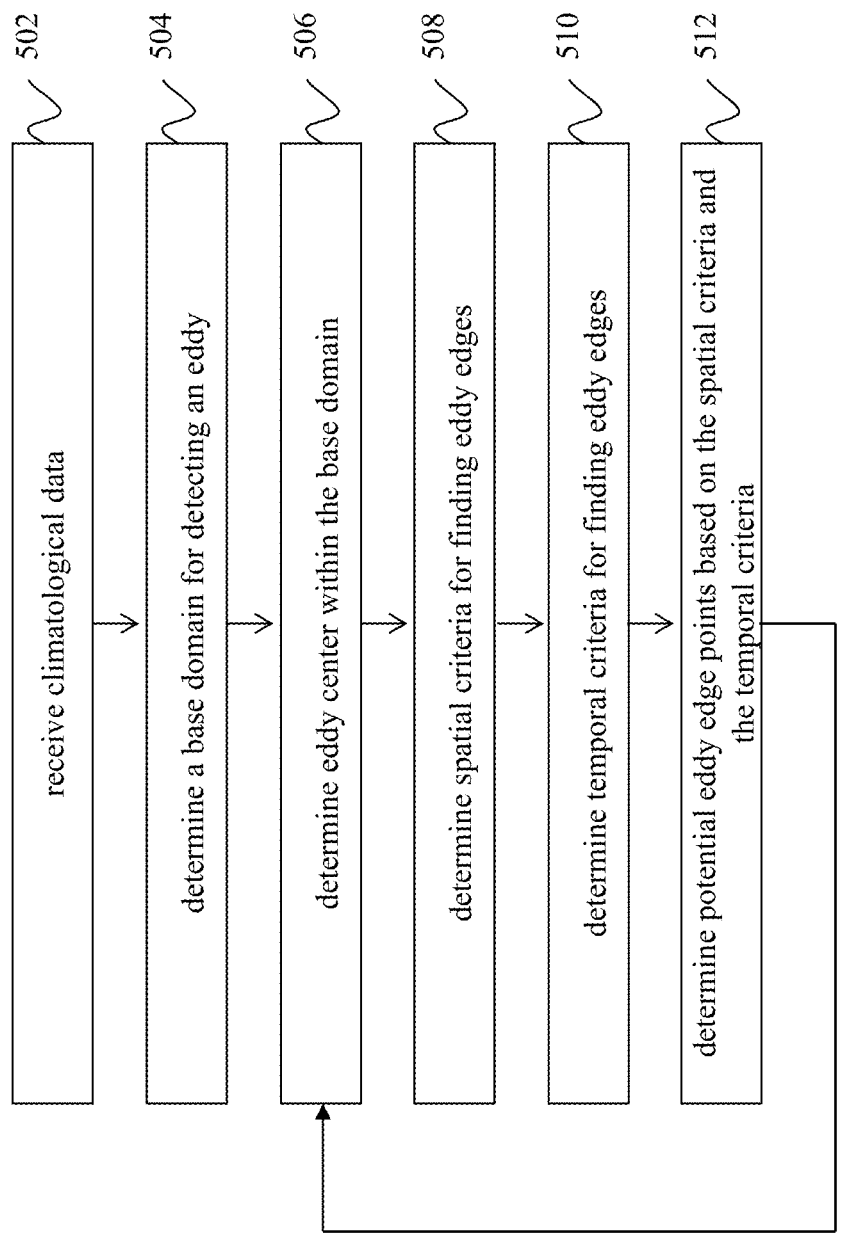
FIG. 5 is a diagram of an exemplary method for detecting ocean eddies in accordance with an embodiment of the present disclosure.

FIG. 5 is a diagram of an exemplary method for detecting ocean eddies in accordance with an embodiment of the present disclosure. In step 502, climatological data is received. For example, in an embodiment, a 2D gridded field of SSHA data is received. For example, this data can be generated by satellite observations and relayed directly from satellite(s) or via a server, computer, and/or other device for processing. In an embodiment, the 2D gridded field of SSHA data includes daily satellite-based sea surface height (SSH) and absolute dynamic topography (ADT) observations gridded to a spatial resolution of ¼°.

In step 504, the base domain is determined. For example, in an embodiment, the base domain can be geographic location and/or geographic range, such as a bounding box specifying latitudes and longitudes of an area of interest. For example, in an embodiment, a bounding box was selected to be centered around the climatological location of the Great Whirl. This base domain can come, for example, from user input, from input from an external device, and/or from the same device performing the method of FIG. 5 (e.g., from one or more predetermined base domains and/or from a base domain based on a current geographic location).

In step 506, the eddy center is determined. For example, in an embodiment, the maximum ADT ($ADT_{max}$) within the domain at the initial time is determined, which corresponds to a Cartesian coordinate. This Cartesian coordinate can be defined as the central point (CP). In an embodiment, we now shift to polar coordinates. In an embodiment, if the CP is not a local maxima, the subsequent steps will reject the presence of the Great Whirl.

In steps 508 and 510, the amount of ADT decline which constitutes each endpoint on an ellipse in the data is determined. In step 508, spatial criteria for finding eddy edges are determined. For example, in an embodiment, a first adjustment parameter can be defined as $AP_{space}$, a space varying adjustment designed to transform irregular shapes into more realistic geometries.

In an embodiment, to determine $AP_{space}$, first the outward ADT gradient (dADT/dr) is found from CP in all directions, where ADT is the topography, and r is the radius. This gradient can be taken as the difference in ADT between the center point (local $ADT_{max}$) and the first point where at least one of the following conditions is met: (1) dADT/dr changes sign (local $ADT_{min}$); or (2) the radius is three Rossby radii from the center. The Rossby radius can be defined as the value at location CP from a climatological background field. In an embodiment, uses of the Rossby radius can be used to generalize an algorithm, since this value can be used to estimate the length scales at which rotation is important in a large-scale circulation.

Next, in an embodiment, for each radial angle around a circle $[0:2\pi]$, Equation (1) can be used to determined $AP_{space}$. In an embodiment, this gives the number of standard deviations each point lies from the average gradient value over the domain. In an embodiment, this term is scaled by dividing by 10 and adding 1 to match the magnitude of a subsequent term. In an embodiment, this lowers the threshold value where the gradient is large and raises the threshold value when the gradient is small. Thus, in an embodiment, the polygon is made to be more circular, which is generally closer to the visually observed circulation pattern.

The choice to divide by the standard deviation can normalize the parameter in a way that places more weight on values near the average, while tapering off the rate of adjustment for extreme values that could potentially skew results (i.e., avoiding over-adjustment from the base threshold value). The result is a normalized range of $AP_{space}$ values following a standard distribution centered around 1 and containing bounds as high as [−0.3:0.3]. In an embodiment, the threshold is divided by this value, so it can be thought of as increasing or decreasing the threshold value (desired ADT contour) by up to ~30% for any given point, but on average 0% over an entire circle [0:2π].

In step 510, temporal criteria for finding eddy edges are determined. For example, in an embodiment, a second adjustment parameter ($AP_{time}$) can be defined as a time varying adjustment designed to negate effects of increasing/decreasing intensity on the area of the eddy (e.g., the Great Whirl). In an embodiment, before the eddy (e.g., the Great Whirl) has been defined, $AP_{time}=1$. In an embodiment, after the eddy (e.g., the Great Whirl) has been defined, $AP_{time}$ can be determined by finding the ratio between the current ADT value and the initial ADT value, using Equation (2):

$$AP_{time} = \frac{ADT_{max}(t)}{ADT_{max}(t_0)} \quad (2)$$

In Equation (2), $t_0$ is the formation date. In an embodiment, this adjusts for the fact that the gradient (intensity) tends to increase as $ADT_{max}$ increases. Thus, in an embodiment, when this parameter is applied, it causes the threshold percentage to decrease during the growth stage and increase during the decay stage, which actively works to maintain a constant ADT target along the edges despite varying gradients over time.

In step 512, potential eddy edge points are determined based on the spatial criteria and the temporal criteria. In an embodiment, a contour that encloses the target region is constructed. For example, in an embodiment, stepwise α=2π, a polygon can be created where the radius of each edge at each angle corresponds to the value at which $r(\alpha)=ATV*(ADT_{max})$ from the center location CP, where ATV stands for Adjusted Threshold Value. In an embodiment, ATV can be determined by Equation (3):

$$ATV = \frac{0.8}{0.5(AP_{time} + AP_{space})} \quad (3)$$

In an embodiment, "spokes" of a circle are generated by defining edges as a set percentage (80% scaled by the adjustments) of ADT change relative to the central point. In an embodiment, an equal balance of both spatial and temporal weights [$AP_{space}(\alpha)$, $AP_{time}(t)$] for a threshold value are used that translate into a broader range of applicability. In an embodiment, if the tip of a spoke does not correspond to the minimum ADT value along that spoke, the spoke can be shortened to the radius at which the minimum occurs. This step can ensure that in instances where the sign of the gradient is not homogenous (usually a result of close proximity eddies or eddy-wave interaction), multiple signals are not conflated as being one large eddy.

Figure 6:
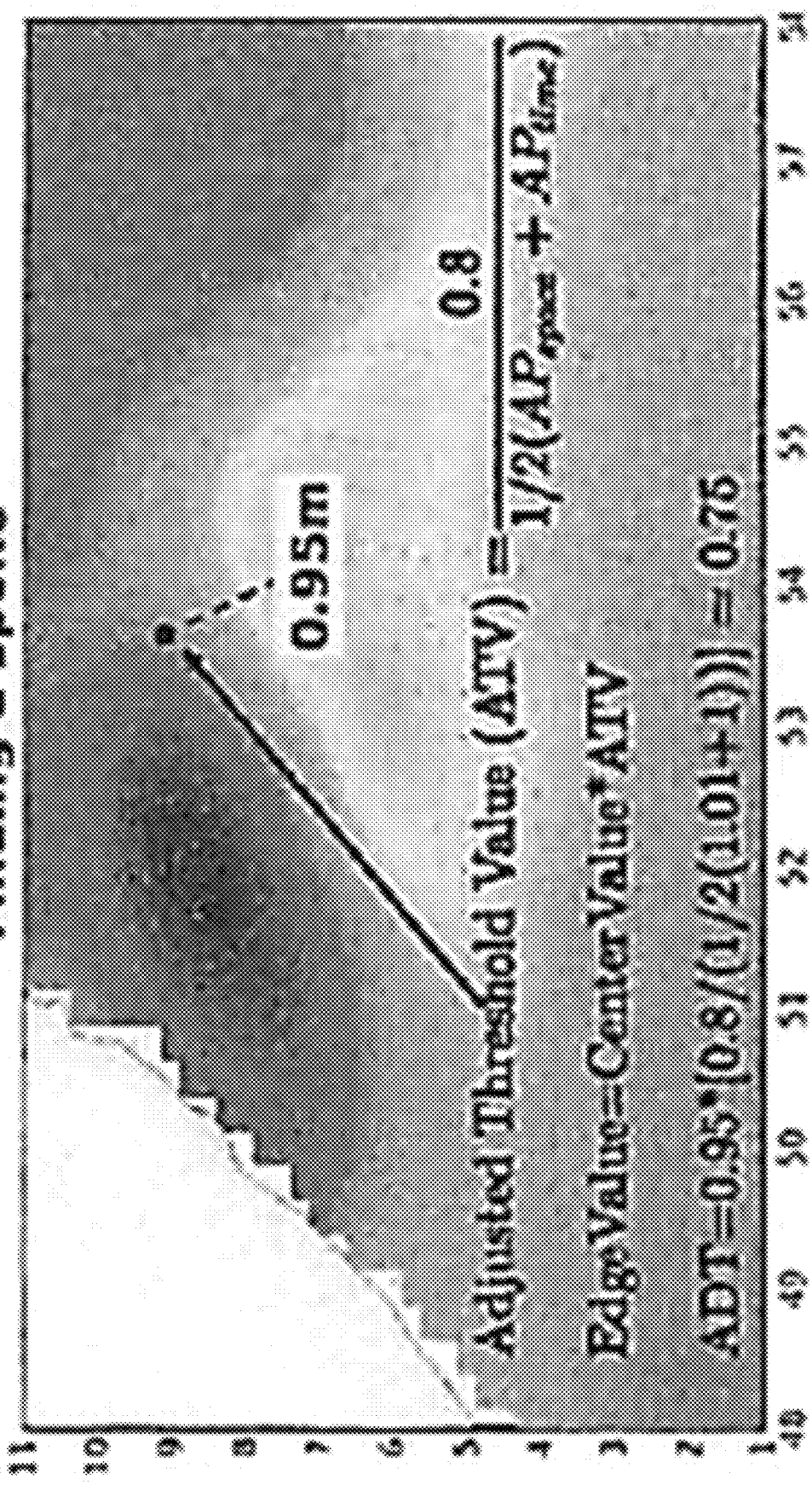
FIG. 6 is an image illustrating finding a spoke before the onset of the Great Whirl in accordance with an embodiment of the present disclosure.
Figure 7:
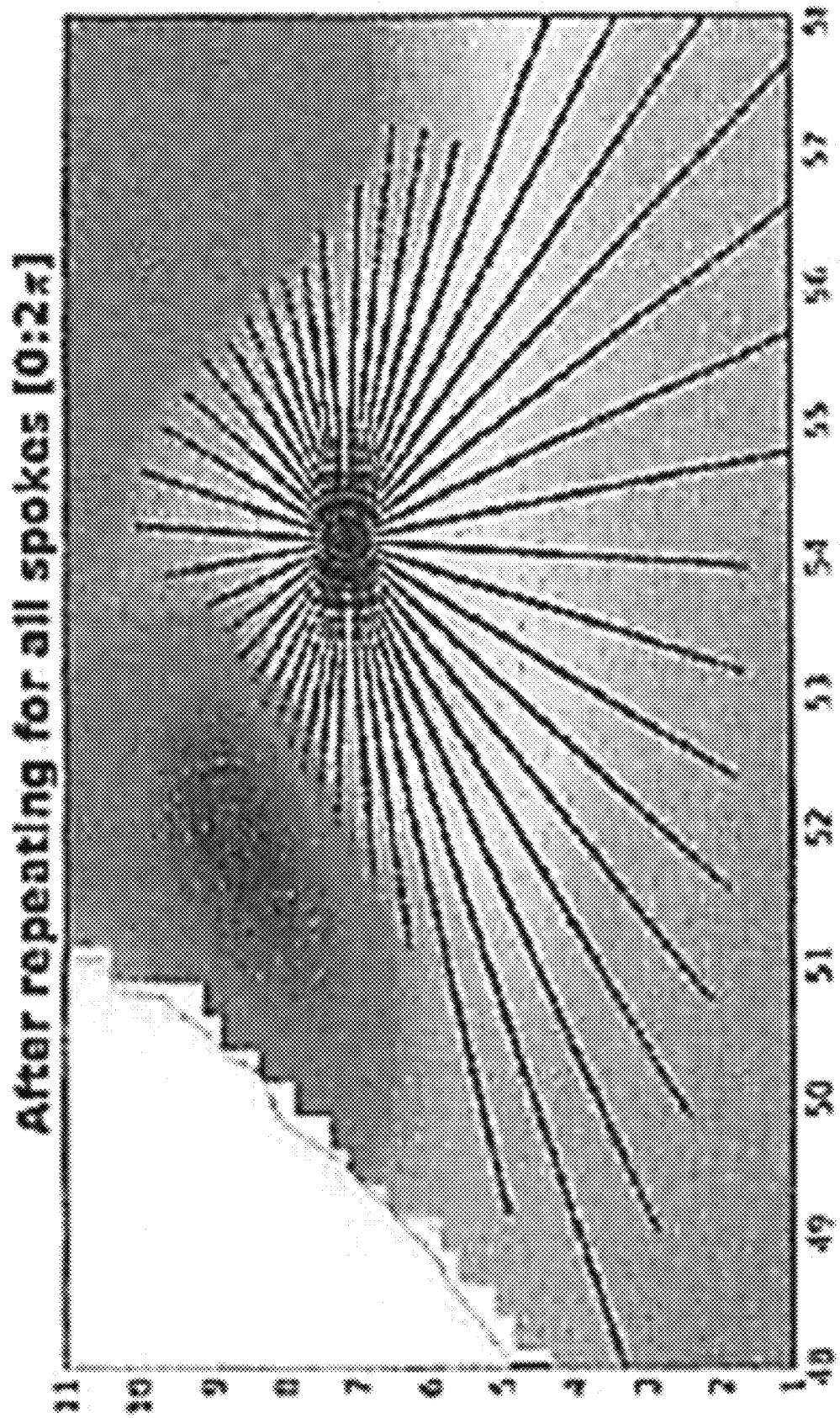
FIG. 7 is an image illustrating finding all spokes before the onset of the Great Whirl in accordance with an embodiment of the present disclosure.
Figure 8:
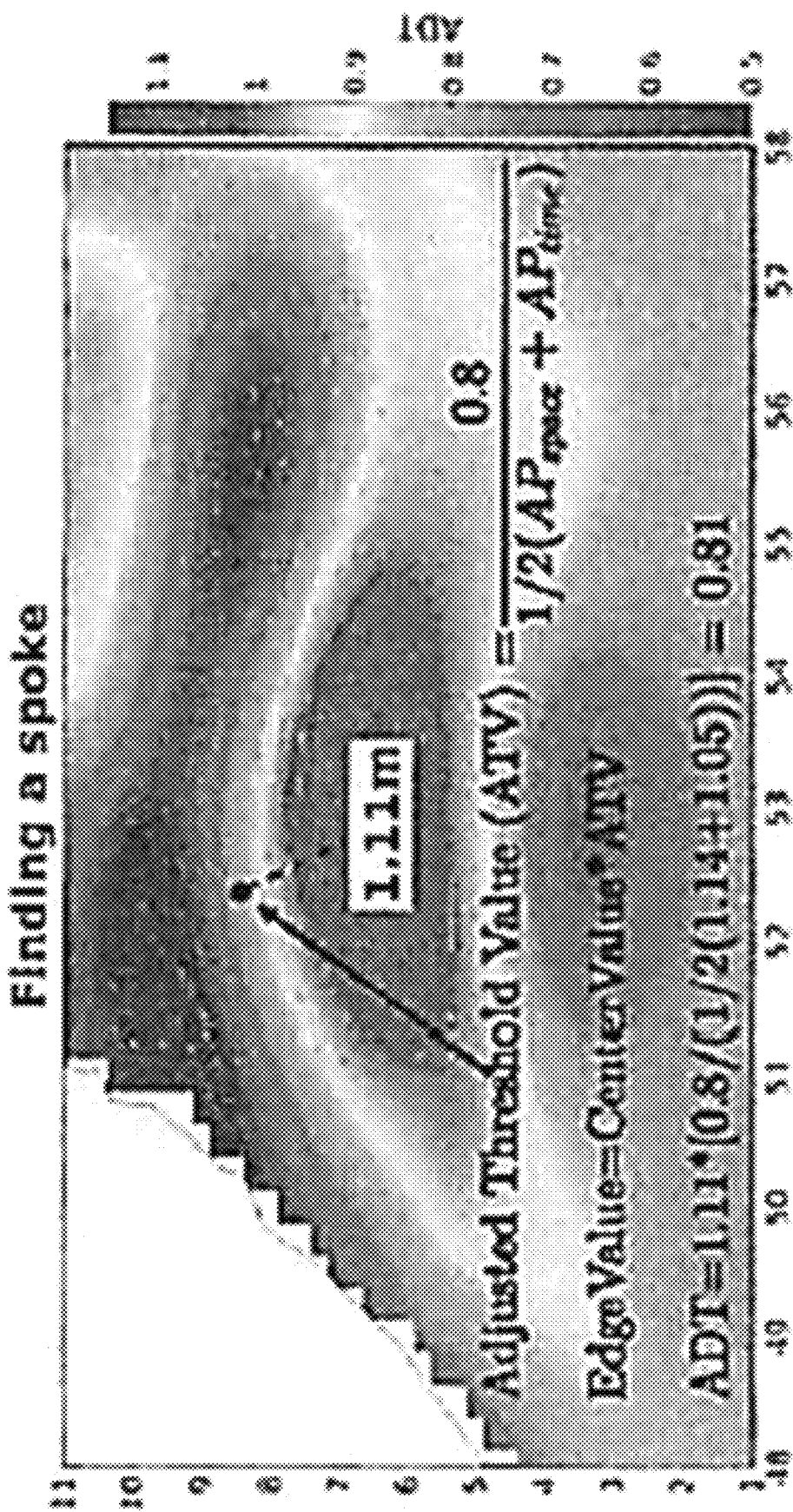
FIG. 8 is an image illustrating finding a spoke after the onset of the Great Whirl in accordance with an embodiment of the present disclosure.
Figure 9:
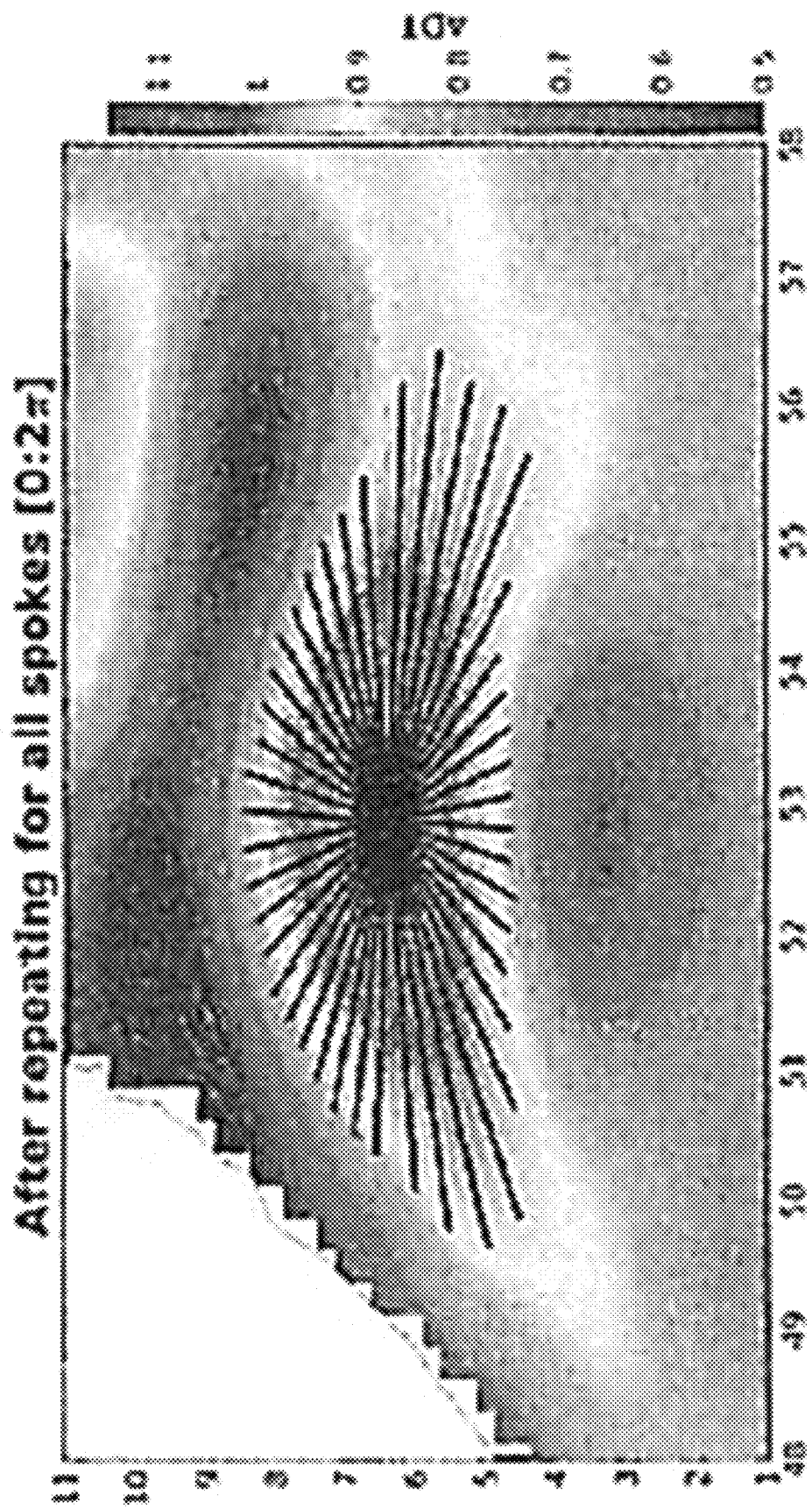
FIG. 9 is an image illustrating finding all spokes after the onset of the Great Whirl in accordance with an embodiment of the present disclosure.

FIG. 6 is an image illustrating finding a spoke before the onset of the Great Whirl in accordance with an embodiment of the present disclosure. FIG. 7 is an image illustrating finding all spokes before the onset of the Great Whirl in accordance with an embodiment of the present disclosure. FIG. 8 is an image illustrating finding a spoke after the onset of the Great Whirl in accordance with an embodiment of the present disclosure. FIG. 9 is an image illustrating finding all spokes after the onset of the Great Whirl in accordance with an embodiment of the present disclosure.

Figure 10:
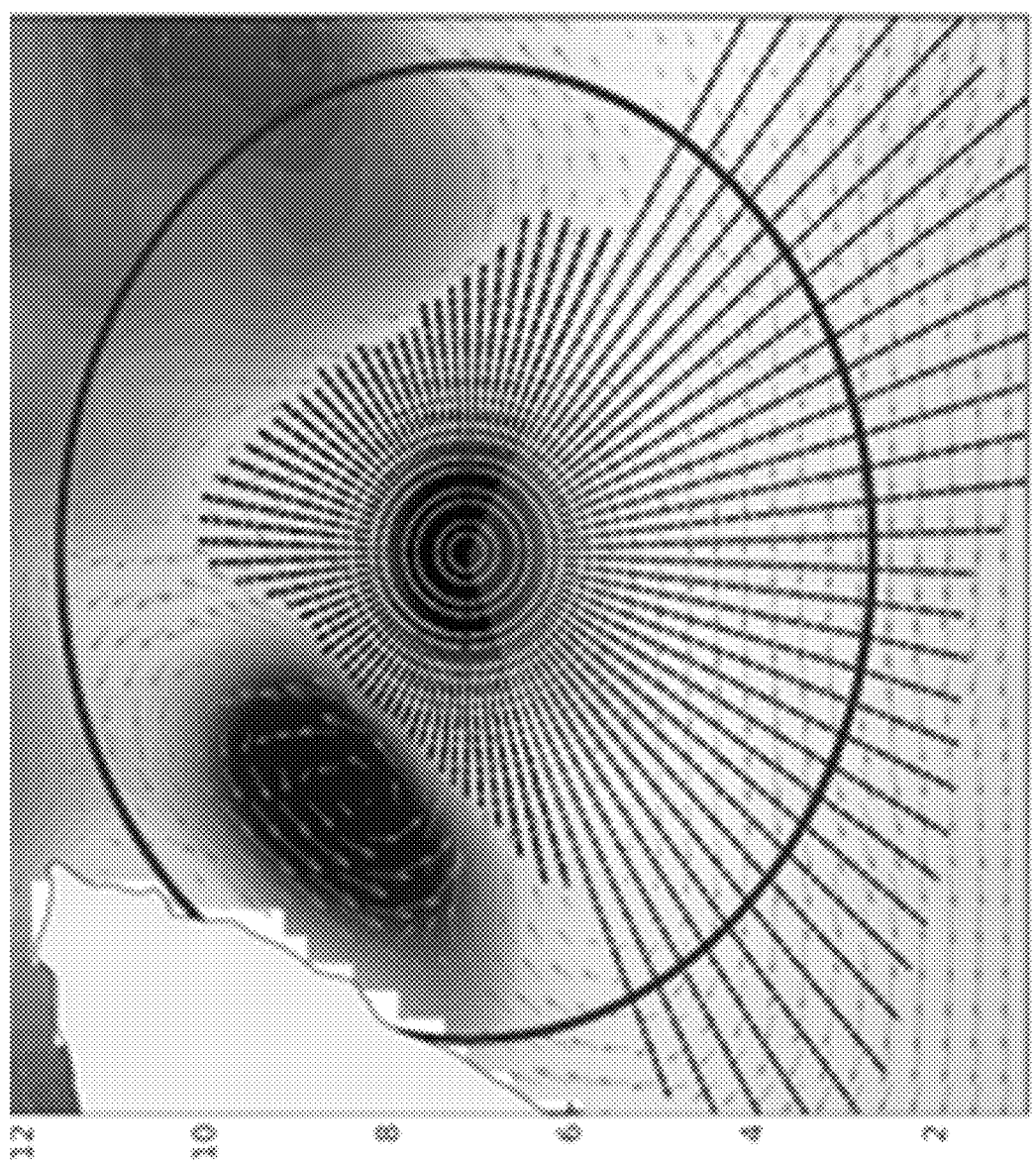
FIG. 10 illustrates edge points that fall outside of a bound of 3 Rossby radii in accordance with an embodiment of the present disclosure.
Figure 11:
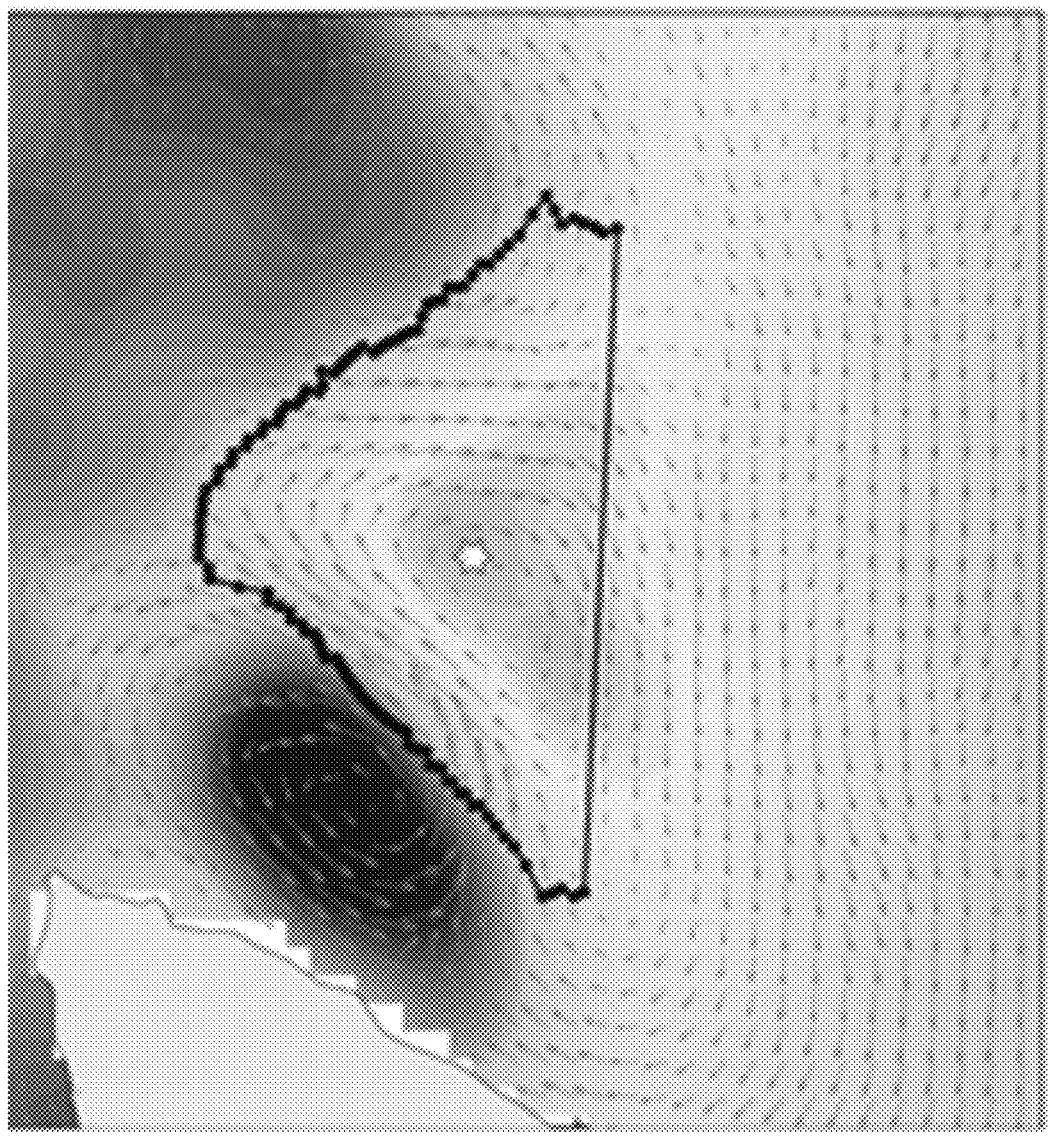
FIG. 11 illustrates drawing a polygon after flagged spokes have been removed in accordance with an embodiment of the present disclosure.

In an embodiment, any edge point that falls outside of a bound of 3 Rossby radii is flagged. In an embodiment, flags can be used to identify angles at which the ADT gradient is insufficient for this method to reproduce a realistic point. In an embodiment, flagged points are removed, and a contour line (e.g., forming a polygon) is drawn by connecting the endpoints of each spoke in a clockwise or counterclockwise fashion. FIG. 10 illustrates edge points that fall outside of a bound of 3 Rossby radii in accordance with an embodiment of the present disclosure. In FIG. 10, spokes at the bottom of the image are considerably longer than other spokes and are flagged for removal. FIG. 11 illustrates drawing a polygon after flagged spokes have been removed in accordance with an embodiment of the present disclosure. In FIG. 11, the flagged spokes from FIG. 10 are removed, and the polygon is drawn by connecting the endpoints of each spoke in a clockwise or counterclockwise fashion.

In an embodiment, because any anticyclonic (cyclonic) eddy in the ocean is characterized by a local sea level anomaly extrema, this flagging system can be applied to help identify the presence or absence of an eddy (e.g., the Great Whirl) at any given time step. If most/all points fall within the outer 450 km radius "bound," it can be inferred that there is likely rotation about the center point, since the gradient in all directions is strong.

In an embodiment, a binary true or false label "Percent Good" ("PG" or "P") can be placed on the existence of the eddy (e.g., the Great Whirl) at a given time step, as shown by Equation (4):

$$PG = \frac{(\text{total points} - \text{flagged points})}{\text{total points}} \quad (4)$$

In an embodiment, PG can be thought of as the percent of all angles that are considered to be "valid" based on whether they fall within the maximum calculated radius for the domain. In an embodiment, this maximum radius can be scaled with the Rossby radius of deformation when applied over a broad geographic region. In an embodiment, a 5-day running mean of this value can be used to check if the eddy (e.g., the Great Whirl) is present or absent based on two options: (1) if $PG_{(t-6:t)}>0.95$ (true case), the eddy (e.g., the Great Whirl) is present; and (2) if $PG_{(t-6:t)}<0.95$ (false case), the eddy (e.g., the Great Whirl) is absent. In an embodiment, the case where $PG_{(t-6:t)}=0.95$ can be set as either true or false.

In an embodiment, the first instance where $PG_{(t-6:t)}>0.95$ is marked as the "formation date" ($t_0$) of the eddy (e.g., the Great Whirl). In an embodiment, the last instance where $PG_{(t-6:t)}>0.95$ is marked as the "termination date" of the eddy (e.g., the Great Whirl). By using the last instance where the threshold PG is met, premature "termination" can be avoided by permitting the instantaneous PG to temporarily fall below the 90% threshold when intraseasonal variability is high, given that it returns to a high value in the days following. In short terms, when the gradient is not strong enough to accurately define an area without heavy interpolation over missing points, the inference can be made that a closed circulation is likely absent.

Next, in an embodiment, the polygon endpoints can be converted back into Cartesian coordinates. In an embodiment, the eddy (e.g., the Great Whirl) can be defined as the area within the contour which has been created by connecting the dots. In an embodiment, this method yields a contour which is more closely aligned with the circulation pattern than previous sea level methods and allows the offset of the sea level maximum location relative to the geometric center of the feature to be seen.

In an embodiment, steps 506-512 can be repeated for each time step (t). The initial domain box can be discarded after the time of the formation ($t_o$) of the eddy (e.g., the Great Whirl) has been established, as each subsequent step from that point will now search for a center value within the previous contour. This allows migrating eddies to be tracked without jumps in space due to unrelated phenomena. In an embodiment, when the termination date has been defined, the algorithm can then reset all local variables and again start the process from scratch in anticipation of the next occurrence. In an embodiment, a polygon can be generated by connecting the endpoints of the eddy in a clockwise or counterclockwise fashion.

4. Exemplary Systems and Devices

Figure 12:
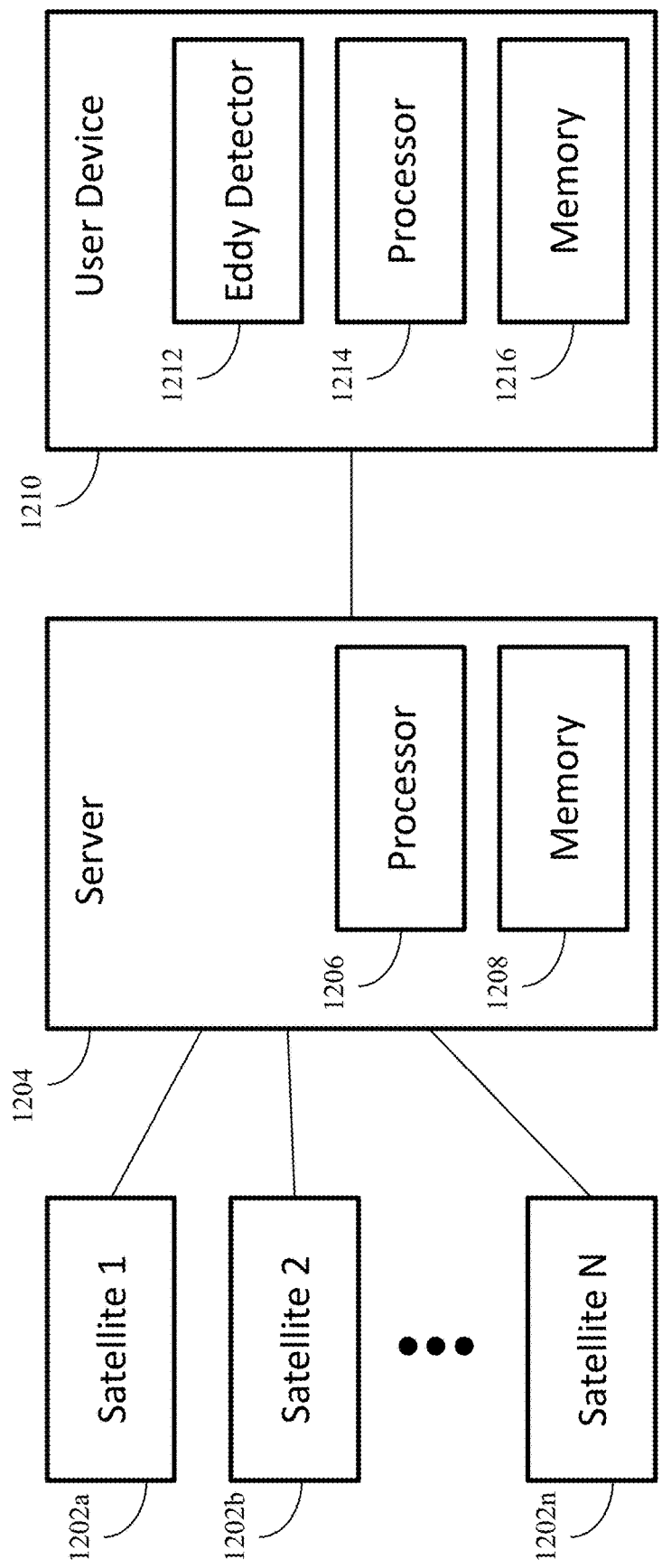
FIG. 12 is a diagram of an exemplary system for eddy detection in accordance with an embodiment of the present disclosure.

FIG. 12 is a diagram of an exemplary system for eddy detection in accordance with an embodiment of the present disclosure. In FIG. 12, one or more satellite(s) 1202 sends data to a server 1204, which has at least one processor 1206 and at least one memory 1208. Server 1204 sends data to user device 1210 for further processing. User device 120 has a least one eddy detector 1212, at least one processor 1214, and at least one memory 1216. In an embodiment, the data sent from server 1204 to user device 1210 includes a 2D gridded field of SSHA or ADT data generated based on observations from satellite(s) 1202. In an embodiment, this data is generated by server 1204 based on observations from satellite(s) 1202. In an embodiment, this data is generated directly by satellite(s) 1202. In an embodiment, user device 1210 receives this data directly from satellite(s) 1202 without having it sent via server 1204. In an embodiment, eddy detector 1212 is a standalone device having its own processor and memory and receives this data from server 1204 directly. In an embodiment, eddy detector 1212 is a standalone device having its own processor and memory and receives this data from satellite(s) 1202 directly. In an embodiment, user device 1210 is a special purpose eddy detection device. In an embodiment, user device 1210 is a general purpose computer implementing an eddy detection device using eddy detector 1212.

In an embodiment, eddy detector 1212 uses the satellite data to detect and/or track the presence of one or more eddies (e.g., using the method of FIG. 5 and processor 1214 and/or memory 1216). In an embodiment, eddy detector 1210 can generate an output (e.g., to user device 1210, to a display, or to one or more communication links) indicating the presence or absence of an eddy, edge points of the eddy, and/or a polygon drawn around the edge points. In an embodiment, user device 1210 is a ship (or is in communication with a ship), and the information from eddy detector 1212 can be used by user device 1210, for example, to aid sonar measurements and/or devices, other acoustic information or devices, and/or navigation. A variety of other embodiments for user device 1210 are also possible in accordance with embodiments of the present disclosure. For example, user device 1210 could be an oil rig, an unmanned aerial or aquatic vehicle, a buoy, or a balloon.

While satellite data is used for eddy detection in the example described above with reference to FIG. 12, it should be understood that eddy detector 1212 can use a variety of sources of data for eddy detection in accordance with embodiments of the present disclosure (e.g., data from buoys, balloons, and/or other sources), given the data includes a pattern of low and high anomalies in 2D that are indicative of a mature eddy. Examples of data include sea surface temperature, sea level pressure, vorticity, longwave radiation, and sea surface salinity.

Eddy detector 1212 can be implemented using hardware, software, and/or a combination of hardware and software in accordance with embodiments of the present disclosure. Eddy detector 1212 can be implemented using a single device or multiple devices in accordance with embodiments of the present disclosure. Eddy detector 1212 can be implemented as a standalone device (e.g., a special purpose device) or integrated into a host device in accordance with embodiments of the present disclosure. In an embodiment, eddy detector 1212 is implemented using software and is installed onto a general purpose computer. In an embodiment, user device 1210 is a special purpose eddy detection device, and eddy detector 1212 is implemented using software installed onto (special purpose eddy detection) user device 1210. In an embodiment, processor 1214 and/or memory 1216 are located within eddy detector 1212.

5. Exemplary Advantages

Ocean current analyses combines multiple sources (e.g., scatterometer, altimeter, thermosteric approximations) to obtain a spatial grid of absolute velocities. As such, this can lead to a propagation or amplification of errors when considering the coupled nature of all input variables. Further, data of direct currents is produced with a greater delay and lower frequency relative to ADT. ADT has the advantage of Near Real Time (~next day) global coverage due to multiple altimeter-carrying satellites simultaneously in orbit. Higher frequency observations are a critical requirement in the identification of nonlinear turbulent processes and also help to increase confidence in the forcing/validation of forecast models. Embodiments of the present disclosure are more practical in operational environments.

Due to this fact, ocean currents are often derived from ADT itself under the assumption that the geostrophic component of the currents is dominant in resolving large scale flow patterns. In the case of features such as the Great Whirl, this can generate much uncertainty in the results. Embodiments of the present disclosure are not dependent on any iterations of ocean currents as input.

Embodiments of the present disclosure operate on the basis of relative sea level rather than absolute sea level, which helps by inherently filtering out interannual variability for studies of the seasonal evolution without adding an additional step of processing. The independence of the central node location relative to the contour surrounding it in embodiments of the present disclosure allows inferences to be made regarding the relative kinetic energy along a given arc of an eddy (e.g., the Great Whirl) based on its proximity to the center, with shorter distances implying a more intense current. In addition, the identification of a specific surface area makes it possible to break down the internal dynamics/ energetics with dynamic time-dependent boundary conditions, which helps to prevent edge damping that may occur when attempting to utilize a static domain on a shifting or expanding feature.

Embodiments of the present disclosure mitigate limitations for former methods, including: (1) the inability to create a closed contour from a semi-enclosed circulation, which is important in regions, such as the Great Whirl, Loop Current, and Agulhas retroflection regions, and is an assumption for many eddy identification algorithms; (2) long term trends (interannual to multidecadal) will necessitate a removal of such trends to compare between different years, which is a processing step that can be cut out in accordance with embodiments of the present disclosure; and (3) the fact that the local sea level anomaly maximum often does not coincide with the center of rotation of the gyre (geostrophic vs ageostrophic flow).

Embodiments of the present disclosure can utilize polar coordinates about a proactively assigned center, as opposed to previous methods that first derive a contour before assigning a geometric center. Embodiments of the present disclosure can use a local maximum as a reference value and can define the base contour level as a value proportionate to the reference. This effectively filters out background conditions that would otherwise generate bias in the results. Embodiments of the present disclosure create two adjustment parameters to shift the target contour level based on both the instantaneous spatial distribution of the variable and the temporal evolution of the feature as it is tracked. Both parameters in conjunction generate an approach with superior adaptability relative to the traditional static contour. Embodiments of the present disclosure can generate a metric detailing the proximity of a local ADT maxima to having a closed circulation when no eddy is present, yielding a tool that can be used to preemptively assess the confidence level of any feature developing into an eddy in the future.

Embodiments of the present disclosure can be utilized on any large body of water. While the Great Whirl is described above as a testing location, embodiments of the present disclosure can be used to detect and/or track a variety of eddies, such as the Loop Current, Agulhas retroflection, South China Sea regions, and the Gulf of Mexico. While an sea level input was used, it is possible to use a variety of variable as input(s) in accordance with embodiments of the present disclosure, given the variable of choice has a pattern of low and high anomalies in 2D that are indicative of a mature eddy. Such examples of alternative variables include sea surface temperature, sea level pressure, vorticity, longwave radiation, and sea surface salinity.

6. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. An eddy detector device for detecting an eddy, the eddy detector device comprising:
 a processing device; and
 a memory coupled to the processing device, the memory containing executable instructions, wherein execution of the executable instructions, by the processing device, causes the processing device to perform operations comprising:
  receiving, using the processing device, climatological data, determining, using the processing device, a base domain for detecting the eddy, determining, using the processing device, a center of the eddy within the base domain, wherein determining the center of the eddy comprises determining a maximum absolute dynamic topography (ADT) observation within the base domain, determining, using the processing device, spatial criteria for finding edges of the eddy, wherein determining the spatial criteria for finding edges of the eddy comprises determining a plurality of outward ADT gradients from the center of the eddy in a plurality of directions, wherein the plurality of directions correspond to a plurality of radial angles around a circle centered at the center of the eddy, determining, using the processing device, temporal criteria for finding edges of the eddy, determining, using the processing device, potential edge points of the eddy based on the spatial criteria and the temporal criteria, and generating, using the processing device, a polygon around the potential edge points.

2. The eddy detector device of claim 1, wherein the base domain is a geographical bounding box of latitude and longitude coordinates.

3. The eddy detector device of claim 1, wherein determining the center of the eddy comprises determining a maximum sea surface height (SSH) observation within the base domain.

4. The eddy detector device of claim 1, wherein determining the spatial criteria for finding edges of the eddy further comprises determining the spatial criteria based on the equation $$AP_{space} = 1 + \left[ (0.1) * \frac{\frac{dADT'}{dr} - \frac{d\overline{ADT}}{dr}}{\sigma\left(\frac{dADT}{dr}\right)} \right]$$

for each radial angle in the plurality of radial angles, where $$\frac{dADT'}{dR}$$

is the ADT gradient along a current angle in the plurality of radial angles, $$\frac{d\overline{ADT}}{dR}$$

is an average ADT gradient along all angles in the plurality of radial angles, and σ represents standard deviation.

5. The eddy detector device of claim 1, wherein determining the temporal criteria for finding edges of the eddy comprises determining a ratio between a current ADT value and an initial ADT value for each radial angle in the plurality of radial angles around the circle centered at the center of the eddy.

6. The eddy detector device of claim 1, wherein determining the potential edge points of the eddy comprises generating a plurality of edges from the center of the eddy at the plurality of radial angles around the circle centered at the center of the eddy.

7. The eddy detector device of claim 6, wherein the radius of each edge in the plurality of edges is based on the spatial criteria and the temporal criteria.

8. The eddy detector device of claim 1, wherein the eddy detector device is further configured to aid a sonar device or navigation device using the generated polygon.

9. A system for detecting an eddy, the system comprising:
a satellite configured to gather climatological data; and
an eddy detector device, the eddy detector device comprising a processing device and a memory coupled to the processing device, the memory containing executable instructions, wherein execution of the executable instructions, by the processing device, causes the processing device to perform operations comprising:
receiving, using the processing device, the climatological data from the satellite, determining, using the processing device, a base domain for detecting the eddy, determining, using the processing device, a center of the eddy within the base domain, wherein determining the center of the eddy comprises determining a maximum absolute dynamic topography (ADT) observation within the base domain, determining, using the processing device, spatial criteria for finding edges of the eddy, wherein determining the spatial criteria for finding edges of the eddy comprises determining a plurality of outward ADT gradients from the center of the eddy in a plurality of directions, wherein the plurality of directions correspond to a plurality of radial angles around a circle centered at the center of the eddy, determining, using the processing device, temporal criteria for finding edges of the eddy, determining, using the processing device, potential edge points of the eddy based on the spatial criteria and the temporal criteria, and generating, using the processing device, a polygon around the potential edge points.

10. The system of claim 9, wherein determining the temporal criteria for finding edges of the eddy comprises determining a ratio between a current ADT value and an initial ADT value for each radial angle in the plurality of radial angles around the circle centered at the center of the eddy.

11. The system of claim 9, wherein determining the potential edge points of the eddy comprises generating a plurality of edges from the center of the eddy at the plurality of radial angles around the circle centered at the center of the eddy.

12. A method for detecting an eddy, the method comprising:
receiving, using a processing device, climatological data;
determining, using the processing device, a base domain for detecting the eddy;
determining, using the processing device, a center of the eddy within the base domain, wherein determining the center of the eddy comprises determining a maximum absolute dynamic topography (ADT) observation within the base domain;
determining, using the processing device, spatial criteria for finding edges of the eddy, wherein determining the spatial criteria for finding edges of the eddy comprises determining a plurality of outward ADT gradients from the center of the eddy in a plurality of directions, wherein the plurality of directions correspond to a plurality of radial angles around a circle centered at the center of the eddy;

determining, using the processing device, temporal criteria for finding edges of the eddy;

determining, using the processing device, potential edge points of the eddy based on the spatial criteria and the temporal criteria; and generating, using the processing device, a polygon around the potential edge points.

13. The method of claim 12, wherein determining the temporal criteria for finding edges of the eddy comprises determining a ratio between a current ADT value and an initial ADT value for each radial angle in the plurality of radial angles around the circle centered at the center of the eddy.

14. The method of claim 12, wherein determining the potential edge points of the eddy comprises generating a plurality of edges from the center of the eddy at the plurality of radial angles around the circle centered at the center of the eddy.

15. An eddy detector device for detecting an eddy, the eddy detector device comprising:
a processing device; and
a memory coupled to the processing device, the memory containing executable instructions, wherein execution of the executable instructions, by the processing device, causes the processing device to perform operations comprising:
receiving, using the processing device, climatological data,
determining, using the processing device, a base domain for detecting the eddy,
determining, using the processing device, a center of the eddy within the base domain, wherein determining the center of the eddy comprises determining a maximum absolute dynamic topography (ADT) observation within the base domain,
determining, using the processing device, spatial criteria for finding edges of the eddy,
determining, using the processing device, temporal criteria for finding edges of the eddy, wherein determining the temporal criteria for finding edges of the eddy comprises determining a ratio between a current ADT value and an initial ADT value for each radial angle in a plurality of radial angles around a circle centered at the center of the eddy,
determining, using the processing device, potential edge points of the eddy based on the spatial criteria and the temporal criteria, and
generating, using the processing device, a polygon around the potential edge points.

16. The eddy detector device of claim 15, wherein determining the potential edge points of the eddy comprises generating a plurality of edges from the center of the eddy at the plurality of radial angles around the circle centered at the center of the eddy.

17. A system for detecting an eddy, the system comprising:
a satellite configured to gather climatological data; and
an eddy detector device, the eddy detector device comprising a processing device and a memory coupled to the processing device, the memory containing executable instructions, wherein execution of the executable instructions, by the processing device, causes the processing device to perform operations comprising:
receiving, using the processing device, the climatological data from the satellite,
determining, using the processing device, a base domain for detecting the eddy,
determining, using the processing device, a center of the eddy within the base domain, wherein determining the center of the eddy comprises determining a maximum absolute dynamic topography (ADT) observation within the base domain,
determining, using the processing device, spatial criteria for finding edges of the eddy,
determining, using the processing device, temporal criteria for finding edges of the eddy, wherein determining the temporal criteria for finding edges of the eddy comprises determining a ratio between a current ADT value and an initial ADT value for each radial angle in a plurality of radial angles around a circle centered at the center of the eddy,
determining, using the processing device, potential edge points of the eddy based on the spatial criteria and the temporal criteria, and
generating, using the processing device, a polygon around the potential edge points.

18. The system of claim 17, wherein determining the potential edge points of the eddy comprises generating a plurality of edges from the center of the eddy at the plurality of radial angles around the circle centered at the center of the eddy.

19. A method for detecting an eddy, the method comprising:
receiving, using a processing device, climatological data;
determining, using the processing device, a base domain for detecting the eddy;
determining, using the processing device, a center of the eddy within the base domain, wherein determining the center of the eddy comprises determining a maximum absolute dynamic topography (ADT) observation within the base domain;
determining, using the processing device, spatial criteria for finding edges of the eddy;
determining, using the processing device, temporal criteria for finding edges of the eddy, wherein determining the temporal criteria for finding edges of the eddy comprises determining a ratio between a current ADT value and an initial ADT value for each radial angle in a plurality of radial angles around a circle centered at the center of the eddy;
determining, using the processing device, potential edge points of the eddy based on the spatial criteria and the temporal criteria; and
generating, using the processing device, a polygon around the potential edge points.

20. The method of claim 19, wherein determining the potential edge points of the eddy comprises generating a plurality of edges from the center of the eddy at the plurality of radial angles around the circle centered at the center of the eddy.

* * * * *